Oct. 30, 1945.　　C. B. McELHOE ET AL　　2,388,212
PICK-UP
Filed Aug. 23, 1943　　4 Sheets-Sheet 1

Inventors.
Calvin B. McElhoe.
George W. Swartz
By Tefft & Tefft
Atty.

Oct. 30, 1945.    C. B. McELHOE ET AL    2,388,212
PICK-UP
Filed Aug. 23, 1943    4 Sheets-Sheet 3
Fig. 3.
Fig. 4.
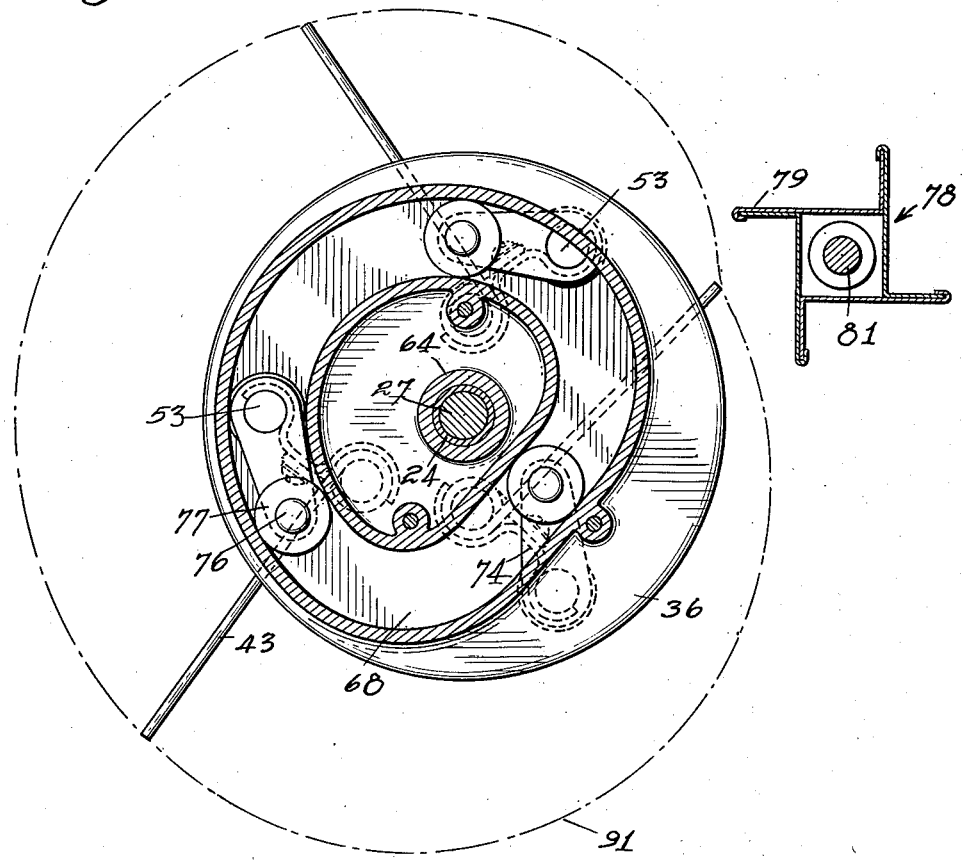
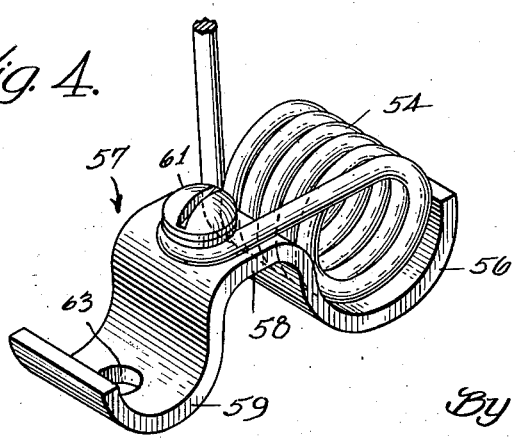
Inventors
Calvin B. McElhoe
George W. Swartz
By Tefft & Tefft Atty.

Oct. 30, 1945.  C. B. McELHOE ET AL  2,388,212
PICK-UP
Filed Aug. 23, 1943  4 Sheets-Sheet 4

Inventors
Calvin B. McElhoe
George W. Swartz
by Tefft & Tefft attys

Patented Oct. 30, 1945

2,388,212

UNITED STATES PATENT OFFICE 2,388,212

PICKUP

Calvin B. McElhoe, Detroit, Mich., and George W. Swartz, Peoria, Ill., assignors to Hart-Carter Company, Peoria, Ill., a corporation of Delaware Application August 23, 1943, Serial No. 499,722

3 Claims. (Cl. 56—364)

This invention relates generally to harvester machines and in particular to a pick-up attachment for harvester machines and the like.

An object of this invention is to provide an improved pick-up attachment for a combine.

A further object of this invention is to provide a pick-up attachment having a positive but gentle lifting action and capable of carrying picked material in an unbroken and uniform stream to a receiving conveyor.

Another object of this invention is to provide a pick-up attachment having a finger pick-up unit adapted to pick clean over uneven ground, level ground and ground covered with stones and like obstructions.

Yet a further object of this invention is to provide a pick-up attachment in which the picked material is positively stripped from the picker fingers and carried to an endless conveyor to eliminate any winding or gathering of the material in the attachment.

A still further object of this invention is to provide a pick-up attachment in which a revolving drum with pick-up fingers therein is of a sectionalized construction so that the fingers are readily accessible for assembly, service and replacement purposes.

A further object of this invention is to provide a pick-up attachment which is light in weight, rugged in design, readily applicable for attachment to a variety of types of harvester machines, and efficient in operation to pick cleanly but gently so as not to damage the grain being picked.

A feature of this invention is found in the provision of a pick-up attachment in which pick-up fingers angularly movable in a revolving drum are spring-supported for individual bending movement and positively guided in their angular movement against entering the drum by associated walled inserts extended within the peripheral confines of the drum.

Another feature of this invention is found in the provision of a pick-up attachment having a rotary drum with end members and pick-up fingers carried on rods rotatably supported in the end members, in which the rods are periodically rotated, to move the fingers inwardly and outwardly relative to the periphery of the drum, by a cam system fully enclosed by means including one of the drum end members.

Yet another feature of this invention is found in the provision of a pick-up finger constructed from a single piece of spring material with a coil spring portion and a pick-up portion. The coil portion is supported on a rotatable rod by means providing for the movement of the pick-up finger with the rod and for the bending of the finger against the pressure of the coil portion on the striking of an obstruction or the like by the pick-up portion.

A further feature of this invention is found in the provision of a pick-up attachment having a revolving drum comprised of end members and detachably connected side sections. Each section is formed with a series of slots to loosely receive corresponding fingers supported at one end on an associated rod carried within the drum and between the drum end members. In order to open the drum for free access to the finger-supporting rod, to assemble or replace a finger on the rod, it is only necessary to remove its corresponding section.

Further objects, features and advantages of this invention will become apparent from the following description when taken in connection with the accompanying drawings in which:

Fig. 3 is a sectional view on line 3—3 in Fig. 2 showing the cam system for operating the pick-up fingers and the position of a finger stripper relative to the pick-up drum;

Fig. 4 is a perspective view of a pick-up finger and a supporting member therefor.

Figure 1:
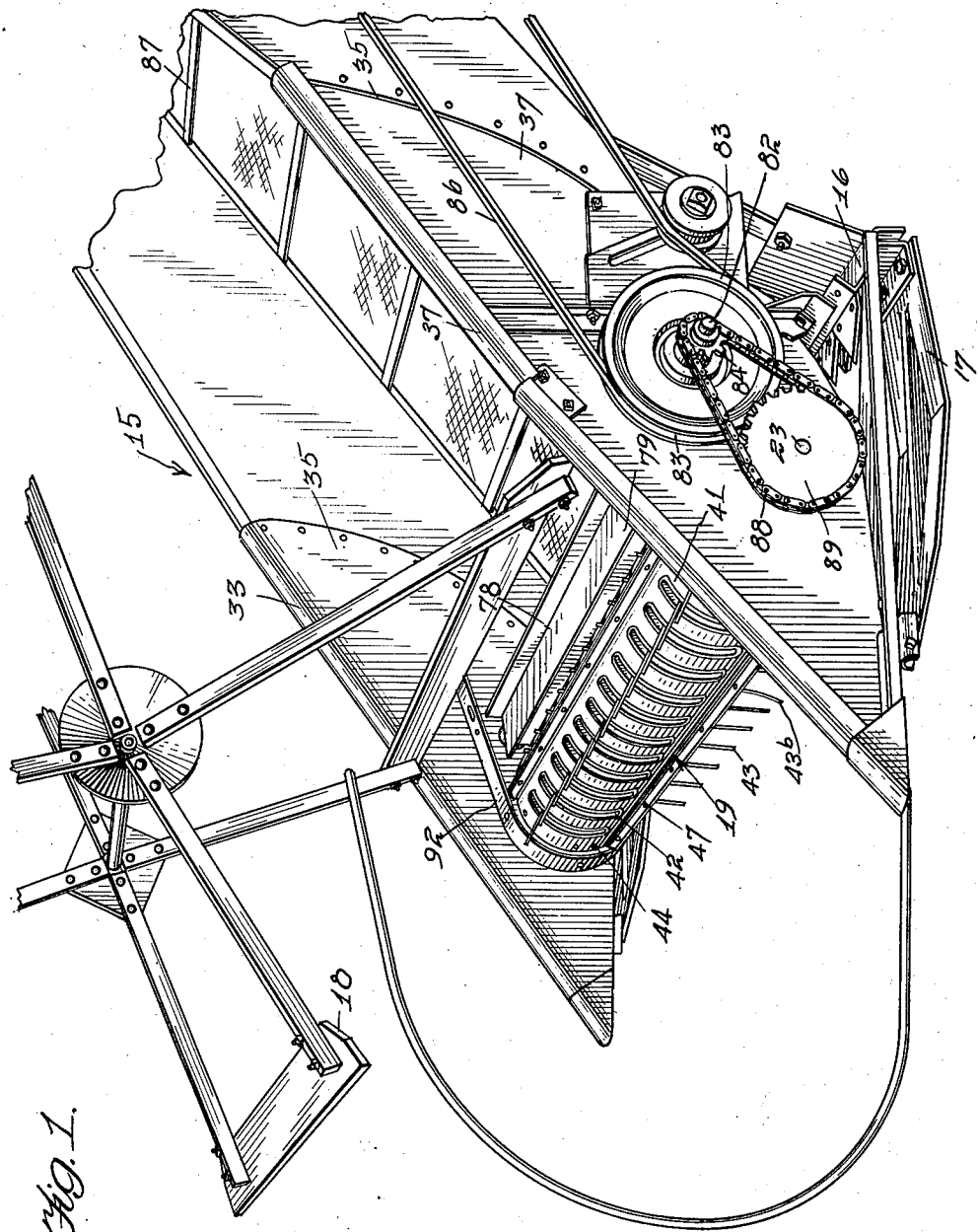
Fig. 1 is a perspective view of the attachment of this invention in assembly relation with the receiving conveyor of a combine.
Figure 5:
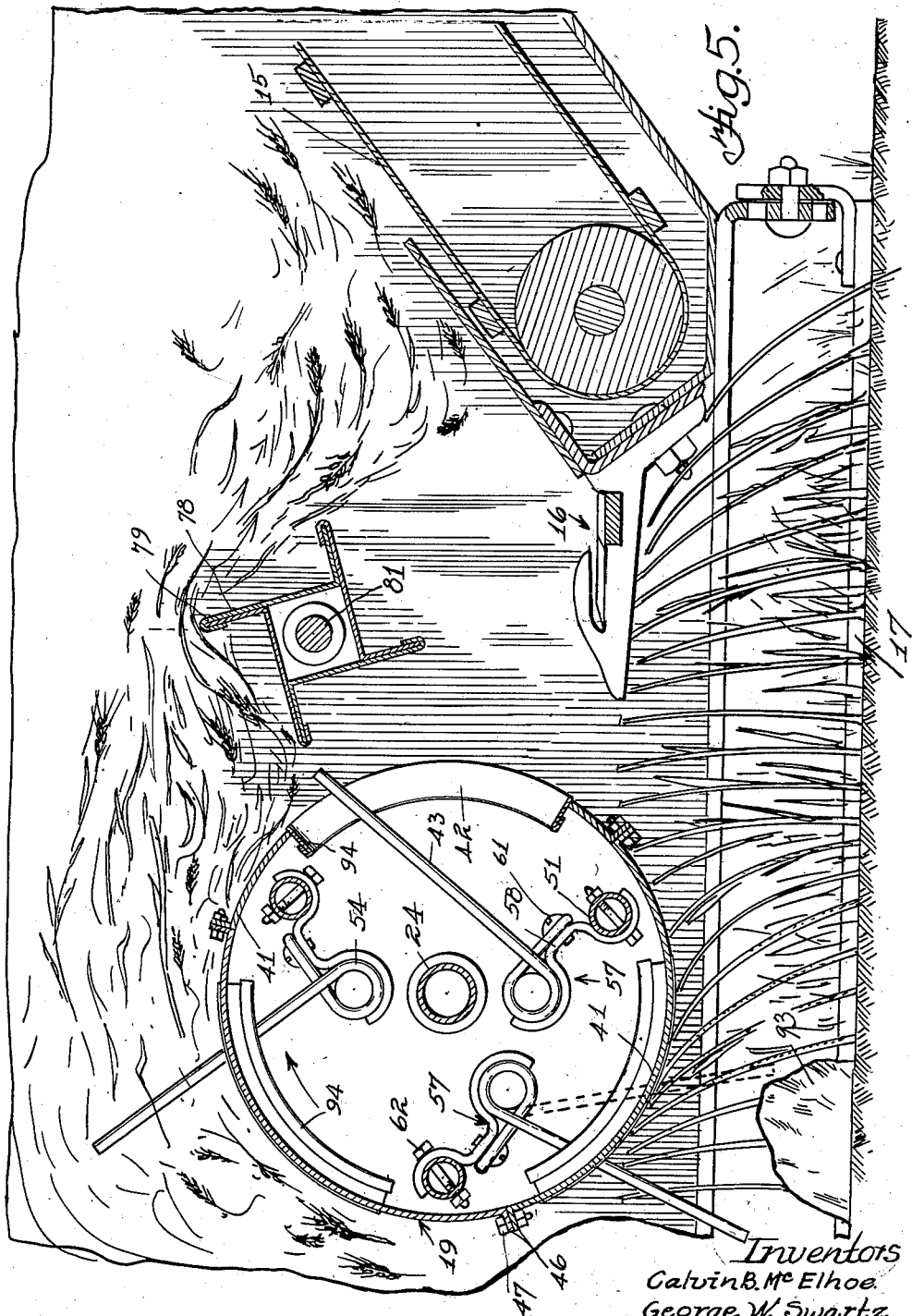
Fig. 5 is a sectional view on line 5—5 in Fig. 2, showing various operating positions of the pick-up fingers and the position of the finger stripper relative to the pick-up drum and the receiving conveyor of the combine.

With reference to the drawings the pick-up attachment of this invention is illustrated in Figs. 1 and 5 as applied to the receiving conveyor 15 of a combine. The combine is of a usual type including a sickle or cutter bar 16 extended across the lower end of the conveyor 15 which is supported on runners 17. A reel 18 is operatively associated with the cutter 16 and in the normal operation of the combine directs the grain toward the cutter 16 and the cut grain into the conveyor 15. When the attachment is to be used the cutter and reel are retained in place, with the sickle being disconnected from operation and the reel 18 used in conjunction with the pick-up attachment as will be later described.

The attachment includes a rotatable drum 19 (Figs. 1 and 2) having end members 21 and 22 and a shaft 23. The shaft is comprised of a center tubular section 24 and solid end sections 26 and 27, having reduced parts 28 and 29, respectively, extended within and secured to corresponding ends of the tubular section 24 as by a press fit, welding or like means. The enlarged part of the end section 28 is journaled in a bearing 32 carried in a side member 33 of the conveyor 15. The end section 27 has the enlarged part thereof journaled in a bearing 34 which is formed as a part of a cam housing 36, carried on the side member 37 of the conveyor 15, and which will be later explained. The shaft 23 is keyed with the hub 67 of the end member 22 at 38 and is secured to the end member 21 at 39.

The peripheral wall or side portion of the drum 19 is comprised of a plurality of like arcuate sections, 41, indicated in Fig. 5 as being three in number. Each section 41 is composed of a sheet metal material and is formed with a series of longitudinally spaced but angularly extended slots 42 for receiving corresponding pick-up fingers 43. Each section 41 (Figs. 1 and 2) is detachably connected at its ends with the drum end members 21 and 22 by screws or the like 44. The longitudinal sides of a section are each formed with an outwardly projected lip or flange 46 to provide for adjacent sections being connected together by bolts 47 extended through adjacent flanges 46 (Figs. 1 and 5). The sections 41 are supported against bending inwardly of the drum 19 by an annular brace plate 48 mounted on the shaft 23 between the drum end members 21 and 22 and connected at its periphery with the arcuate sections 41.

Located within the drum cylinder 19 in an angularly spaced relation are a plurality of tubular pick-up finger supporting shafts or rods 51 corresponding in number to the arcuate sections 41. Each shaft 51 is rotatably supported in corresponding boss portions 52 formed in the end members 21 and 22, with each shaft terminating at one end in the end member 21, but having an opposite end 53 extended through the end member 22 and into the cam housing 36.

Figure 2:
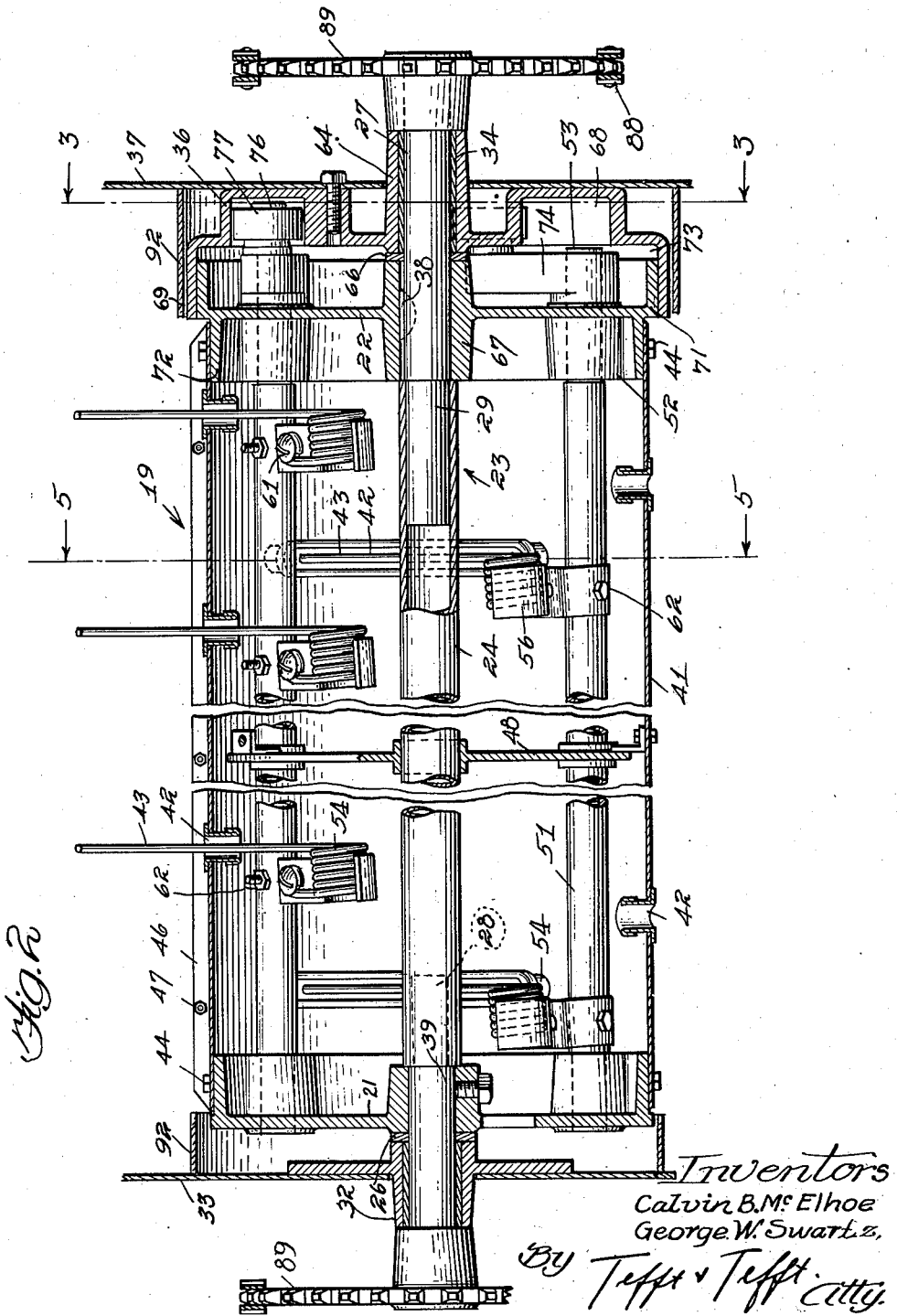
Fig. 2 is a longitudinal sectional view of the pick-up attachment taken through the pick-up drum.

Each shaft 51 over the portion thereof between the end members 21 and 22 carries a series of axially spaced fingers 43 corresponding in number to the slots 42 in an arcuate drum section 41. A finger is formed of a single piece of spring material with a coil spring 54 and a straight pick-up prong extended radially from the coil spring and through a corresponding slot 42 (Figs. 2 and 4). To provide for an angular movement of a prong 43 against the pressure of a corresponding coil 54 the coil is cradled in one U part 56 of a double U-shaped bracket or supporting member 57, with the free end of the coil being secured to the intermediate connecting section 58 between the two U parts 56 and 59 by a screw 61. The U part 56 is constructed so as to be positionable about a shaft 51 and is clamped to the shaft by a bolt 62 extended through the shaft 51 and an opening 63 formed in the bottom of the U part 59.

As clearly appears from Figs. 2 and 5 a coil spring 54 is positioned axially of the drum 19 and to the following side of a shaft 51 relative to a normal clockwise direction of rotation of the drum, as indicated by the arrow in Fig. 5. With a prong 43 projected from a spring 54 adjacent the connecting section 58 of the supporting bracket 57, the prong is capable of being moved in a reverse direction relative to the direction of rotation of the drum and against the pressure of the spring 54 for a purpose which will be noted later.

During the operation of the attachment a row of prongs 43 are concurrently and periodically moved in corresponding slots 42 to in turn periodically vary the extension of a row of prongs relative to the periphery of the drum. This movement of the prongs is accomplished by periodically rotating the shafts 51 through a cam system now to be described.

The cam housing 36, previously mentioned, has a hub 64 (Figs. 2 and 3) through which the shaft 23 is rotatably extended, with a wearing ring 66 being positioned between the hub 64 and the hub 67 of the drum end member 22. The housing 36 is of a substantially cup shape and includes a cam track 68 formed in its bottom and about the hub 64. The top marginal rim 69 of the cup-shaped housing 36 is of a diameter to extend over and slidably engage an annular flange 71 on the outside of the drum end member 22 which is of a greater diameter than an annular flange 72 to the inside of the end member 22 to which the arcuate drum sections 41 are secured. A fully enclosed space 73 is thus provided between the end section 22 and the cam housing 36.

The shaft ends are projected within the space 73 and each carry a rocker arm 74 having a stub shaft 76 at its free end for rotatably supporting a roller or cam follower 77 located within the cam track 68.

In the assembly of the attachment on the combine illustrated in the drawings the drum 19 is extended across the lower or receiving end of the conveyor 15 between the side members 33 and 37 and ahead of the cutter bar 16 (Figs. 1 and 5), the side members 33 and 37 constituting a part of the attachment and being detachably connected with the conveyor as indicated at 35. Also forming a part of the attachment is a rotatable stripper 78 formed of four substantially L-shaped members, relatively assembled as shown in Figs. 3 and 5, to provide a substantially square-shaped central body section with a vane 79 extended from each corner, and with adjacent vanes being normal to each other. The stripper is rotatably supported in and between the side members 33 and 37 rearwardly and upwardly relative to the drum 19, as also illustrated in Figs. 3 and 5. A shaft 81 for the stripper has an end 82 projected through the side member 37 on which is mounted a pulley 83 and a gear sprocket 84. The pulley 83 is connected through a belt 86 with a drive (not shown) for the conveyor belt 87 and is normally rotated in a clockwise direction as viewed in Fig. 1. The sprocket 84 in turn is connected by a sprocket chain 88 with a gear 89 carried on the drum shaft 23 to the outside of the side member 37. As illustrated in Fig. 2 the gear system above explained may be assembled to the outside of either one of the side members 33 and 37, or to both sides thereof, depending upon the type of combine or harvester machine to which the attachment is being applied. As explained before, the sickle 16 is disconnected from operation and the reel 18 may or may not be disconnected against operation.

The operation of the attachment of this invention is best understood with reference to Fig. 5. When the machine is advanced over the ground the drum 15 and the stripper 78 are rotated in clockwise directions as viewed in Fig. 5. During the rotation of the drum each row of fingers or prongs 43 is periodically moved by the cam system 68—77 so that the fingers are extended a maximum distance outwardly from the drum 19 as they are moved adjacent the ground, and substantially retracted within the drum as they pass the stripper 78. As shown by the dot-dash line 91 in Fig. 3 the fingers are fully extended from the drum for about 180° of each revolution of the drum, and are then gradually retracted over the remaining 180°, with the minimum extension of the fingers from the drum taking place substantially opposite the stripper 78. The gear connection between the stripper and the drum is such that a flange 79 of the stripper passes adjacent a row of fingers 43 when such fingers are in their innermost position.

The material picked up from the ground or stubble is carried upwardly by the fingers 43 to the top of the drum 19 while they are in a substantially fully extended position. When the fingers are moved from the top of the drum and downwardly toward the rear of the drum they are gradually retracted within corresponding slots 42 so that the picked material is progressively stripped from the fingers. The material thus left free on the drum is carried downwardly, concurrently with a continued retraction of the fingers, toward the rotary stripper 78 which strips the remaining picked material from the retracted fingers 43 and carries this remaining material, as well as the material previously stripped from the fingers, into the conveyor 15. By virtue of this complete removal of the picked material from the fingers 43 and the carrying of the material to the conveyor 15 by the stripper 78 there is no gathering or bunching of material at the receiving end of the conveyor 15. Further, since the fingers 43 are thus completely stripped of material no winding of the material about the drum 19 takes place and the fingers are entirely clean for the next pick-up operation.

Any winding of the picked-up material about the ends of the drum 19 is eliminated by guard or shield members 92 one of which is located at each end of the drum. Each section 92 is supported on a corresponding side member 33 and 37 and is of a shape to extend downwardly over the front of the drum 19 and over a corresponding drum end member 21 and 22 and rearwardly from the top of the drum 19 to a position beyond the stripper 78.

Under some conditions of operation, such as where the machine is operated on windy days, or where the material to be picked is of a heavy growth and of light weight, the reel 18 can be operated with the attachment to supplement the action of the stripper 78 in preventing the gathering of material at the head or lower end of the conveyor 15, and in maintaining a smooth and unbroken flow of the picked-up material into the conveyor.

As previously mentioned each finger 43 has a coil spring 54 supported on a shaft 51 such that the finger is capable of being moved against the pressure of the spring in a direction opposite to the advance of the attachment across the ground, or in a reverse direction relative to the rotation of the drum 19. Where the material is being picked from uneven or rough ground, therefore, the fingers 43 in a row of fingers are independently movable on engagement with uneven ground surfaces to retracted positions providing for their clearing the uneven ground so that material is picked up from both high and low ground surfaces in the path of the cylinder 19. In the event a rock or like obstruction is in the path of a finger, such finger is moved back against the pressure of its associated coil spring 54, as indicated for the finger 43a in Fig. 5, to clear a rock designated as 93, and thus prevent damage to the finger.

It is readily appreciated that a finger 43 along with its angular movement in a corresponding slot 42, is also movable transversely of the slot on its engagement with uneven ground surfaces, obstructions and the like. The sides of a slot 42, which are in guiding engagement with a finger 43, are thus subject to appreciable wear. Since the slots are formed in the sheet metal arcuate sections 41 this wear may take place relatively fast, or the sides of the slots may even be bent outwardly by a finger 43 under some conditions of operation.

To reduce the wear on the guiding slots, as well as to prevent a finger from being retracted within a slot 42 and within the peripheral confines of the drum 19, each slot is provided with an arcuate walled guard 94 (Figs. 2 and 3) of a shape corresponding to the contour of a slot 42 and insertable within a slot and about a finger 43 so as to lie substantially entirely within the peripheral confines of the drum 19. The sides of a slot 42 are thus reenforced and the increased bearing surface of the fingers 43 with the walled sides of the guard or insert provides for a more positive angular guiding of the fingers and a longer wearing of a guide 94. As shown for the finger 43b in Fig. 1, this guiding action may take place even when such finger has been bent out of a normal straight line shape.

From a consideration of the above description it is seen that the invention provides a pick-up attachment for a harvester machine or the like which is of a light and durable construction, readily applicable to a variety of types of harvesting machines, and efficient in operation to pick clean both uneven and level ground surfaces and regardless of whether such surfaces may have rock obstructions thereon. The invention provides further a stripper unit in combination with a pick-up drum which cooperates with retractable pick-up fingers in the drum to strip the fingers clean of all picked-up material and to lift and carry this material into an endless conveyor so as to substantially eliminate any gathering of material at the receiving end of the conveyor and any winding of this material about the pick-up drum. It is to be understood that although the attachment of this invention is illustrated as applied to a combine that it is not to be so limited since it may be readily applied to harvester machines of a different type.

It is to be understood also that although the invention has been described with respect to a preferred embodiment thereof it is not to be so limited since modifications and changes can be made therein which are within the full intended scope of the invention as defined in the appended claims.

We claim:

1. In a pick-up attachment for a harvesting machine or the like, a rotary drum having end members, a rod rotatably supported in said end members, a series of flexible pick-up elements on said rod, each of said elements being formed of a single body member having a coil spring portion and a pick-up portion, a supporting member for each element having a substantially double U-shape in cross section, with said coil portion being cradled in one of said U parts and connected at one end between the two U parts, and the other U part being adapted to receive said rod, means for securing a supporting member on said rod so that the pick-up portion of a finger element is projected outwardly from the periphery of said drum, means for rotating said rod to periodically move said pick-up portions toward and away from the periphery of said drum, with a pick-up portion being movable, on striking an obstruction, in a direction such as to increase the pressure of a corresponding coil portion.

2. In a pick-up attachment as described in claim 1; the rotatable drum being formed of a plurality of arcuate side members corresponding in number to the rotatable rods, said side members being removable to permit replacement and repairs of the flexible pick-up and supporting members.

3. In a pick-up attachment as described in claim 1; the end members of the rotatable drum being enclosed by stationary cup shaped housing members.

CALVIN B. McELHOE.
GEORGE W. SWARTZ.